(12) United States Patent
Brown

(10) Patent No.: US 10,123,063 B1
(45) Date of Patent: Nov. 6, 2018

(54) PROTECTING USER PRIVACY DURING COLLECTION OF DEMOGRAPHICS CENSUS DATA

(71) Applicant: comScore Inc., Reston, VA (US)

(72) Inventor: Michael A Brown, Ashburn, VA (US)

(73) Assignee: comScore, Inc., Reston, VA (US)

( * ) Notice: Subject to any disclaimer, the term of this patent is extended or adjusted under 35 U.S.C. 154(b) by 343 days.

(21) Appl. No.: 14/494,579

(22) Filed: Sep. 23, 2014

Related U.S. Application Data

(60) Provisional application No. 61/881,409, filed on Sep. 23, 2013.

(51) Int. Cl.
G06F 15/16 (2006.01)
H04N 21/24 (2011.01)
H04N 21/258 (2011.01)
H04N 21/81 (2011.01)
H04N 21/61 (2011.01)
H04N 21/25 (2011.01)
H04N 21/658 (2011.01)
H04N 21/643 (2011.01)

(52) U.S. Cl.
CPC ....... *H04N 21/2408* (2013.01); *H04N 21/252* (2013.01); *H04N 21/25883* (2013.01); *H04N 21/6125* (2013.01); *H04N 21/64322* (2013.01); *H04N 21/6582* (2013.01); *H04N 21/812* (2013.01); *H04N 21/8173* (2013.01)

(58) Field of Classification Search
CPC .......................... H04N 21/2408; H04N 21/252
USPC .................................................. 709/203, 201
See application file for complete search history.

(56) References Cited

U.S. PATENT DOCUMENTS 8,438,184 B1* 5/2013 Wang ..................... H04L 67/02
707/780
2011/0103394 A1* 5/2011 Vogt .................. H04L 29/12367
370/401
2013/0238431 A1* 9/2013 Kulasooriya ........ G06Q 20/202
705/14.51

* cited by examiner

*Primary Examiner* — Dustin Nguyen
*Assistant Examiner* — Joel Mesa
(74) *Attorney, Agent, or Firm* — Baker & Hostetler LLP

(57) ABSTRACT

In general, the systems, components, methods, and techniques are provided for gathering, recording, and developing accurate user demographics attributed to users viewing content across different media platforms while protecting user privacy and providing compliance with legal or policy mandated privacy provisions.

23 Claims, 11 Drawing Sheets

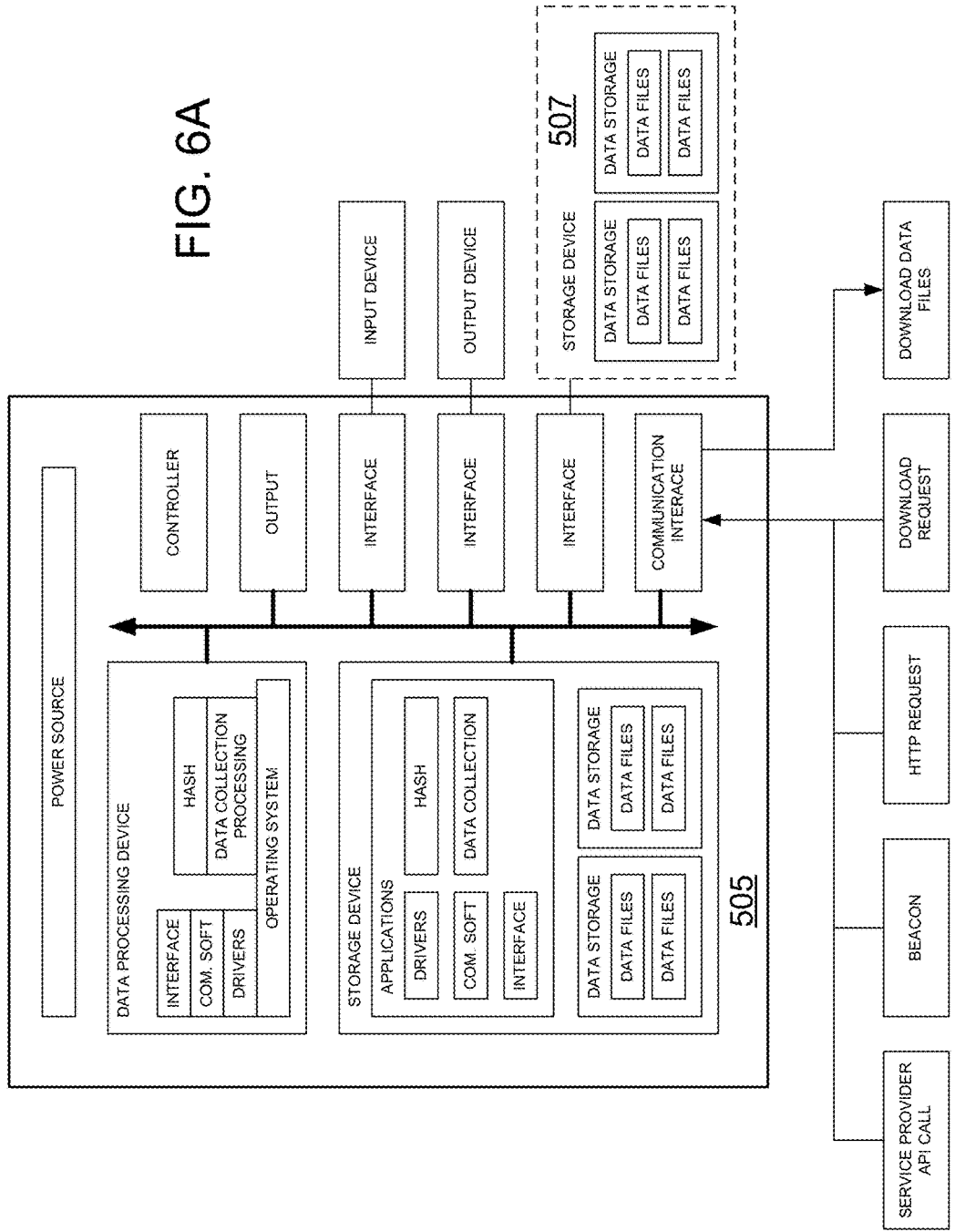

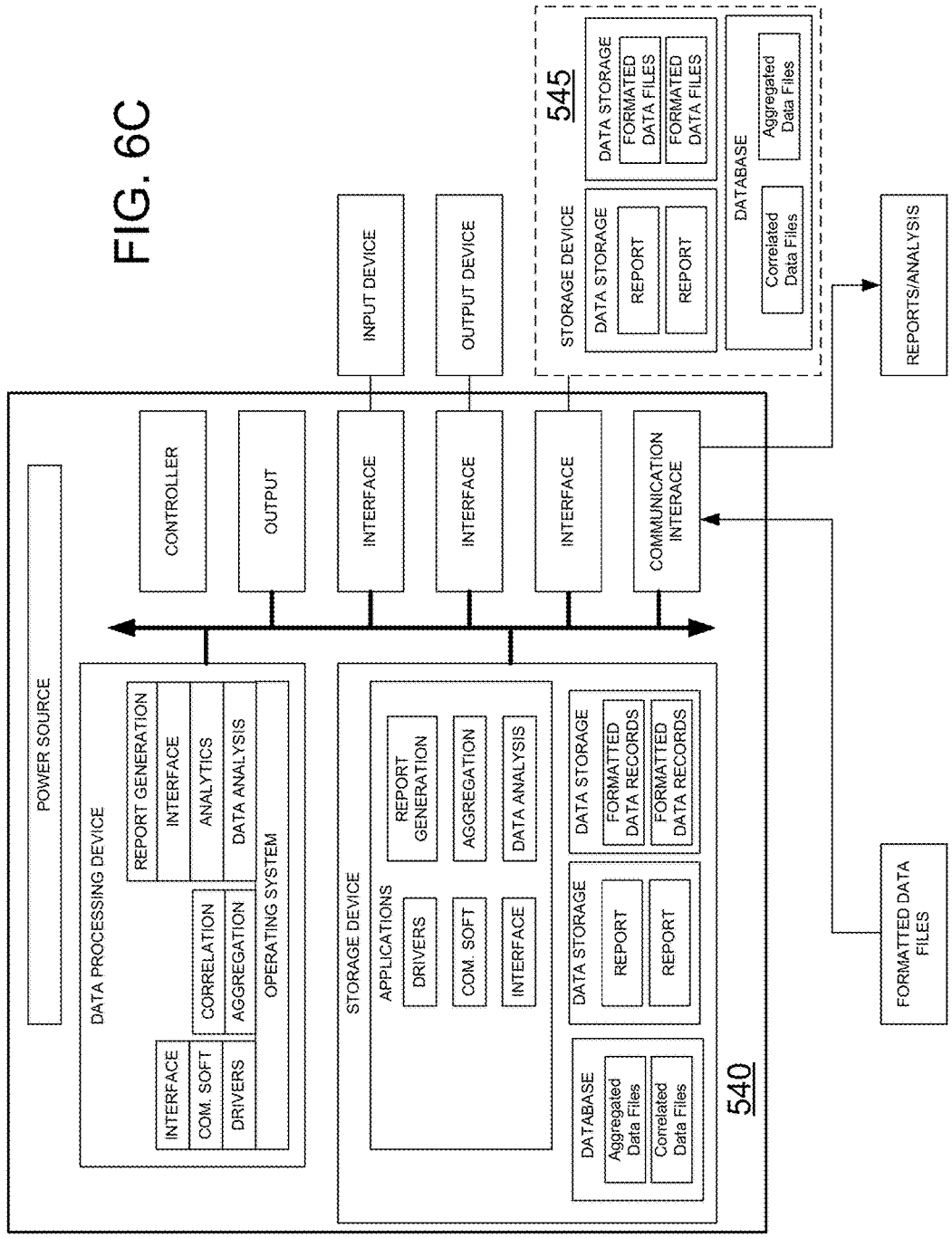

FIG. 7

PROTECTING USER PRIVACY DURING COLLECTION OF DEMOGRAPHICS CENSUS DATA

CLAIM OF PRIORITY

This application claims the benefit under 35 USC § 119(e) to prior filed U.S. Provisional Patent Application Ser. No. 61/881,409, titled "PROTECTING USER PRIVACY DURING COLLECTION OF DEMOGRAPHICS CENSUS DATA" filed on Sep. 23, 2013, which is herein incorporated by reference in its entirety for all purposes.

BACKGROUND

In general, accesses by client systems to web pages, web content, or any other resources may be recorded with consent of users. These records may be anonymously combined with demographic data or demographic profiles associated with the individuals using the client systems. The demographic profile created from user demographics may provide enough information about the typical member of a group to model a hypothetical population of users. Typically, when developing demographic profiles, researchers first try to determine what subgroups or segments exist in an overall population; and then researchers try to create a clear and complete picture of the characteristics of a typical member of each segment of the population. Once these profiles are constructed, the profiles can be used for many things, such as, for example, to develop a marketing strategy, to develop plans, and to make evaluations. Examples of demographics for marketing include age, gender, income level, race, and ethnicity to name a few. In particular, understanding consumer behavior, such as how consumers interact with a particular website, group of websites, or any other resource based on demographics helps organizations make better decisions, for example, that improve traffic flow to their website or an objective of their website. In addition, understanding an audience visitation and habits may be useful in supporting advertising planning, buying, and selling.

Due to the amount of data generated by users and their devices, most access providers do not see all the activity of a device and content providers only see activity on their respective site. As a result, service and content providers rely on third parties to analyze their data to provide a complete view. Typically this entails providing personally identifiable information (PII) of the service and content provider's users to the third parties. For example, one data set having associated PII and a second data set having associated PII are provided to a third party matching service to create a matched data set that is then provided to the content and service providers. However, matching services typically are not able to perform analysis in real time because of the volume of data and number of transactions involved. In addition, as concerns about privacy by users increase, content and service providers want to limit or eliminate any disclosure of PII information.

SUMMARY

In general, the systems, components, methods, and techniques are provided for gathering, recording, and developing accurate user demographics attributed to users viewing content across different media platforms while protecting user privacy and providing compliance with legal or policy mandated privacy provisions.

In one general aspect, a computer implemented method of providing analysis of exposure of users to content without the use of personal identifiable information (PII) by one or more processing devices of an analysis system is provided. The method includes: receiving each of the first user information associated with a distinct entity, the user information including a deterministic, unique identifier (ID) created from a previous request associated with the online content; receiving a plurality of second user information indicating access of offline content, each of the second user information associated with a distinct entity, the user information including a deterministic, a unique ID previously associated with the access of the offline content; correlating at least one of the first user information indicating access of online content with at least one of the second user information indicating access of offline content by at least one of the deterministic, unique IDs; creating a database of records including the correlated information; and processing a plurality of the records of the database by analyzing the correlated information to generate a report indicating user exposure to content over multiple content media platforms including online content and offline content without using any PII of the users.

The method also may include receiving a unique ID that is a deterministic one-way hash of an Internet Protocol (IP) address associated with the access of the online content by a distinct entity.

The method also may include receiving an obfuscated IP address corresponding to an IP address associated with the access of the online content by a distinct entity, creating a database of records includes storing information derived from the obfuscated IP address; and processing a plurality of the records of the database includes processing information obtained from the obfuscated IP addresses.

The method also may include receiving a portion of an IP address that has been changed from a corresponding original IP address associated with the access of the online content and a remainder that corresponds to the original IP address associated with the access of the online content.

In one example, the offline content is TV programming or on demand video programming content and the online content includes advertising content.

In another general example, a computer implemented method of providing analysis of exposure of users to content without the use of personal identifiable information (PII) by one or more processing devices of an analysis system is provided. The method includes: receiving, by at least one of the processing devices of the analysis system, a plurality of user information indicating access of online content, each of the user information associated with a distinct entity, the user information including a deterministic, unique identifier (ID) created from a previous request associated with the online content; correlating, by at least one of the processing devices of the analysis system, at least one of the user information indicating access of online content by at least one of the deterministic, unique IDs; creating, by at least one of the processing devices of the analysis system, a database of records including the correlated information; and processing, by at least one of the processing devices of the analysis system, a plurality of the records of the database by analyzing the correlated information to generate a report indicating user exposure to online content without using any PII of the users.

The method also may include receiving a deterministic one-way hash of the internet protocol (IP) address associated with the access of the web content by a distinct entity.

The method also may include receiving an obfuscated IP address corresponding to an IP address associated with the access of the online content by a distinct entity; creating a database of records includes storing information derived from the obfuscated IP address; and processing the plurality of the records of the database includes processing information obtained from the obfuscated IP address.

The method also may include receiving a portion of an IP address that has been changed from a corresponding original IP address associated with the access of the online content and a remainder that corresponds to the original IP address associated with the access of the online content.

In one example, the online content is advertising content.

In yet another general aspect, a computer implemented method collecting exposure of users to content without the use of personal identifiable information (PII) by one or more processing devices of a collection system is provided. The method includes: receiving a message associated with access of online content by a user device, the message including an Internet Protocol (IP) address associated with a network location where the user device accessed the web content; applying a deterministic, one-way function to at least the IP address of the message to generate a unique identifier (ID); obfuscating the IP address used to create the unique ID by changing, removing, or replacing a portion of the IP address to render the obfuscate IP address without PII; storing a data record with the unique ID, the obfuscated IP address, and additional non PII user information derived from the message; and transmitting the data record to a data analysis system for analysis of the record without use of PII.

The method also may include applying a deterministic one-way function includes applying a deterministic, one-way hash algorithm to the IP address.

The method also may include irreversibly changing a portion of the IP address from the original IP address to protect user privacy.

The method also may include leaving a remainder of an original IP associated with the obfuscated address unchanged.

In one example, accessed web content is advertising content.

In yet another general example, a data analysis system providing analysis of exposure of users to content without the use of personal identifiable information (PII) is provided. The system includes a data receiving system and a data analysis system. The data receiving system includes: a communications interface receiving a plurality of user information indicating access of online content, each of the user information associated with a distinct entity, the user information including a deterministic, unique identifier (ID) created from a previous request associated with the online content; at least one processing device processing the received user information and creating a data record for each unique ID; and at least one storage device storing the plurality of records. The data analysis system includes at least one processing device accessing the stored records; correlating at least one of the user information indicating access of online content by at least one of the deterministic, unique IDs; creating a database of records including the correlated information; and processing a plurality of the records of the database by analyzing the correlated information to generate a report indicating user exposure to online content without using any PII of the users.

The communications interface may receive a plurality of user information indicating access of offline content, each of the user information associated with a distinct entity, the user information including a deterministic, a unique ID previously associated with the access of the offline content. The at least one processing device of the receiving system may process the received user information indicating access of offline content and creates a data record for each unique ID which is stored in the storage device. The at least one processing device of analysis system may correlate at least one of the user information indicating access of online content and at least one of the user information indicating access of offline content by at least one of the deterministic, unique IDs; create a database of records including the correlated information; and process a plurality of the records of the database by analyzing the correlated information to generate a report indicating user exposure to content over multiple content media platforms including online content and offline content without using any PII of the users.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

BRIEF DESCRIPTION OF THE DRAWINGS

FIGS. 6A, 6B, and 6C show examples of components of the data collection and analysis systems for protecting user PII.

FIG. 7 shows an example of a census report for a unique ID.

DETAILED DESCRIPTION

Figure 1A:
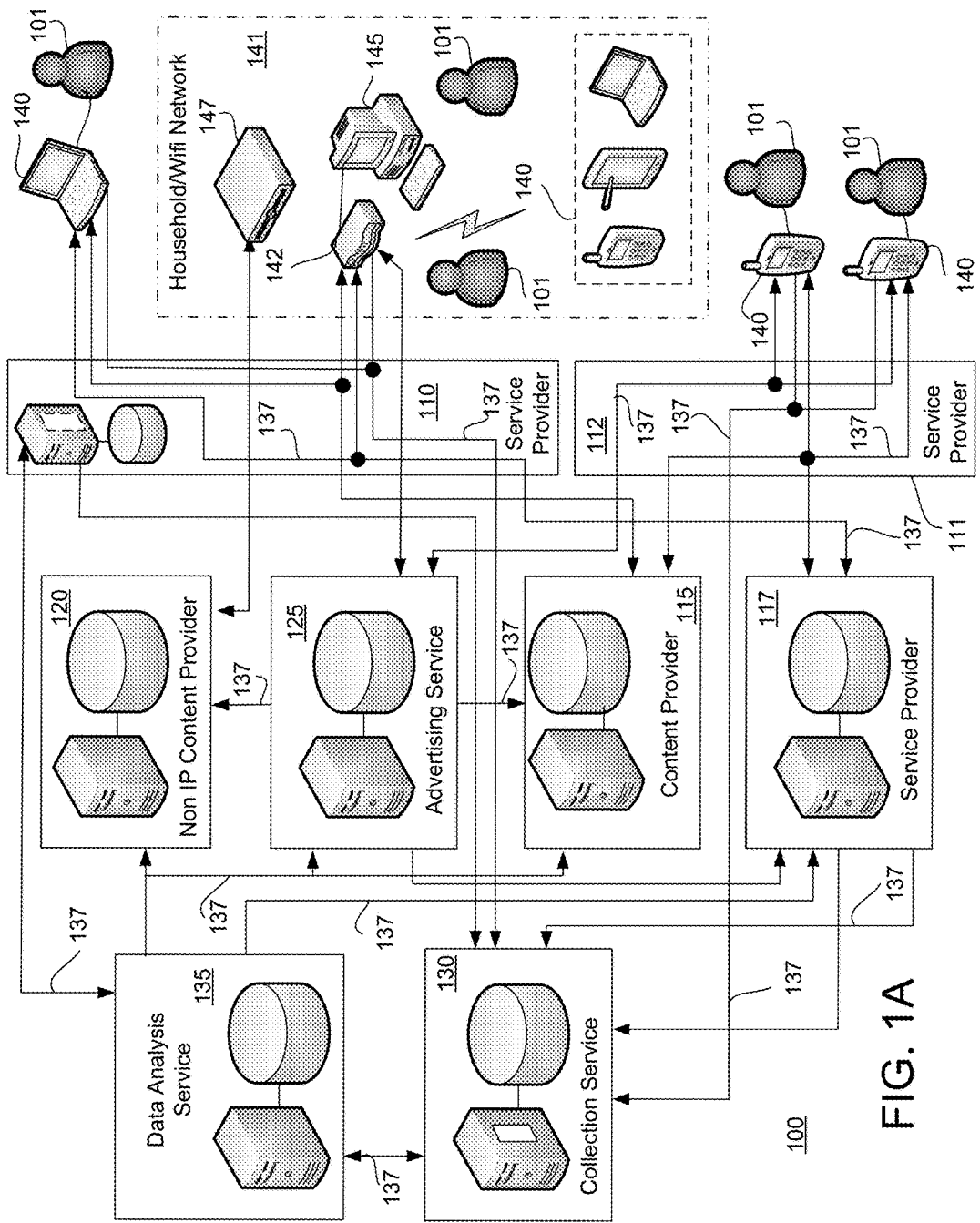
FIG. 1A illustrates an example of a system in which data from multiple content sources is collected and analyzed while protecting user PII.

In general, the following description provides systems, components, methods, and techniques for gathering, recording, and developing accurate user demographics attributed to users viewing content across different media platforms while protecting user privacy and providing compliance with legal or policy mandated privacy provisions.

Census data and user demographics may be obtained through various processes which monitor or observe user interaction with and access to content. For example, user access to web content may be monitored using a panel-based approach or a beacon-based approach. A panel-based approach generally entails installing a monitoring application on the user devices of a panel of users that have agreed, in advance with informed consent, to have their devices monitored. The monitoring application then collects information about the webpage or other resource accesses and sends that information to a collection server. A beacon-based approach generally involves associating a beacon with the resource being accessed such that a beacon message is generated when a user device renders or otherwise employs the resource. For example, when executed by the user device, the beacon sends a message to a collection server. The beacon message may include certain information, such as an identifier of the resource accessed, a unique identifier associated with the user device, and/or a time of the event. The panel based information and the beacon based information may be aggregated and analyzed by a data analysis provider to create important insight into users' behaviors including access and consumption of online content in addition to the effectiveness of advertising. In addition, new user behavior may be continually aggregated to provide continuing analysis of user behavior over time, observe changes in user behavior, and predict future user behavior. Users also access content and advertising through other media platforms or sources that do not use Internet Protocol (IP) communications, such as some mobile phone services, for example, short message services (e.g., SMS, EMS, and MMS) and location based services; non-IPTV television services; and radio services to name a few. Additional insight can be obtained by comparing overall media consumption by a user across many media platforms. In order to aggregate information about a user's access or exposure to content and related advertising across different media platforms, information that can be used to identify the user behavior across the various platforms is needed.

However, access to data received from the panel approach, beacon approach, or information generated by offline communications could identify a specific user and the sharing of such information between different non-related parties may raise concerns about the privacy of users and the use of any information that may uniquely identify such a user, sometimes referred to as Personally Identifying Information (PII).

Users and privacy advocates have increasingly expressed concerns about the use of PII by technology companies. In response, various localities, jurisdictions, and nationalities have begun to regulate the use and safeguarding of PII exposing businesses to legal challenges and liabilities. In addition, because of the world-wide reach of the Internet across geographic boundaries and borders, different rules and regulations in various different jurisdictions can make it difficult for some businesses to comply with these regulations. Furthermore, many technology companies are increasingly interested in maintaining user privacy and securing user PII while still receiving useful analysis of their user's behavior. Accordingly, providing meaningful analysis of user behavior without unduly exposing PII of the underlying users is a technical goal for most technology companies, and data analysis providers in particular.

FIG. 1A, shows a system 100 that provides robust data collection and analysis while safeguarding the privacy of the census traffic used for analysis of user behavior. Traditional matching services that perform analysis use PII of users, such as, for example, a name and an address. Typically, datasets that include the PII are sent to third party matching services, which compare the PII of the data sets to return matches based on the PII. In marked contrast, the system of FIG. 1A, provides technology to uniquely identify user content consumption and behavior during a given time period in a privacy-friendly way that does not require sharing PII with the data analysis service or using information that can be used to retroactively identify the actual user who generated the information. As a result, user privacy is protected, businesses are better able to comply with privacy laws and regulations across different jurisdictions, and exposure to potential liabilities are reduced.

In the example shown in FIG. 1A, a system 100 for collecting, aggregating, analyzing and reporting user consumption of content across different media delivery platforms while maintaining anonymity of any particular analysis of user information is provided. As shown in FIG. 1A, the system 100 includes a plurality of users 101, a service provider 110, a service provider 112, a web content provider 115, an online service provider 117, an offline service provider 120, an advertising service 125, a data collection service 130 and a data analysis service 135. The various components of the system 100 communicate or exchange data via any number of communications paths 137.

Data and content may be exchanged between the various system components through a communication interface and communication paths 137 using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6).

Connection or access to various media platforms of the system 100 are supplied by the service providers 110, 112. In one example, a service provider 110 may provide access to content through two or more networks that support different media platforms, such as internet access, mobile/smart phone/wireless network access, radio network access, and non-IP/terrestrial TV/video network access. Today, many service providers 110 bundle these services for the convenience of users and/or their households. As a result, the service provider has unique access to information across media platforms. In another example, a service provider 112 may support a single media platform, such as a mobile telecommunications network provider, a telephony service provider, or a cable service provider.

Typically, a user has an account with the service provider 110, 112 that is associated with one or more of the services. The account may include personal and demographic information about the user and/or their household, such as name, address, age, payment information, and even personal preferences of the user. In addition, the account may have information associated with various user devices for which the service provider provides service. This information may include serial numbers, phone numbers, MAC addresses, network IDs, user agents, and IP addresses among other information that uniquely identify devices associated with a user or household. As a result, the service provider has access to unique identifying information associated with a particular user across various the media platforms associated with the user and/or household.

Any typical user 101 of the service provider 110, 112 may have a number of associated user devices. For example, a user device may be a consumer electronics device, a mobile phone, a smart phone, a personal data assistant, a digital tablet/pad computer, a hand held/mobile computer, a wearable device, a personal computer, a laptop computer, a notebook computer, a work station, a vehicle computer, a game or entertainment system, a set-top-box or any other device for accessing and presenting various media content and advertising. One set of user devices may be categorized as mobile devices 140, such as a mobile/smart phone, a laptop computer, or a tablet that are able to provide access to content via a mobile network of the service provider 110, 112 (and its subsidiaries and/or partners) at any number of locations were network service is present. In addition, the user may have other stationary devices that are typically associated with a certain location, for example, a household or wifi hot spot 141, such as a personal computer 145 connected to the Internet through a wired connection to the network of the service provider 110, or a set top box (STB) 147 providing access to traditional non-IP TV programming (e.g., from a TV/Video content or any other type of offline service provider 120), on demand video content, or other audio/visual content through cable, satellite, or fiber optic networks provided by the service provider 110 and its subsidiaries and/or partners. In addition, both static and mobile devices of the household 141 may access the service provider 110 through a single point of connection or device, such as a gateway or wireless area network provided by a wireless router 142 associated with a location.

In addition, online service providers 117 supply online services (or online services and content) to users who access the services through their user devices. Examples, of online service providers includes banks, travel agencies, social networks, and online shopping networks to name a few. Many times such service providers are accessed through an application program interface (API) that connects to the service provider 117 through another content source or application making it difficult for the online service provider to ascertain the content or context in which the service is being viewed, used or provided. However, the service provider would have access to, for example, IP addresses associated with the API calls.

Users employ their devices 140, 145, and 147 to access and consume content, advertising, and services. The content, advertising, and services are consumed from IP communication sources and platforms associated with online sources of content and non-IP communication sources and platforms including content and data associated with offline activities, consumption and exposures (offline content).

The data collection service 130 collects and aggregates information and data about user access of, exposure to, and interaction with content and advertising. For example, the data collection service 130 may include one or more servers and corresponding data storage configured to receive messages from a user device as the device accesses content. The data collection service 130 aggregates data and periodically supplies the aggregated data to the data analysis service 135.

The data analysis service 135 includes one or more servers with corresponding storage that receive the aggregate data, process the data to perform various analyses of the data and generate various reports regarding the data that are useful for providing understanding of audience visitation and habits to support advertising planning, buying, and selling. In one example, information is collected by the collection service 130 using a beacon based approach. In general, a beacon-based approach may entail associating a beacon with content that causes a message to be sent to the collection service 130 when content is accessed by a user device. For example, a user device may include a browser or any other application (e.g., mobile applications or apps) that retrieves online content from a web content provider 115 and presents the retrieved web content at the user device. Web content can be, for example, a web page and/or an advertisement in or associated with a web page, or any other content retrieved from the World Wide Web. In general, publishers of the web content may agree with the entity operating the collection service 130 and/or analysis service 135 to include a beacon in some or all of their web pages or web content. For example, a beacon can be implemented using an imbedded image, object, tag, or script. The beacon is rendered or otherwise employed with the web content in which the beacon is included. When rendered or otherwise employed, the browser or other application sends a message request to the collection servers of the collection service 130.

The beacon message includes certain information, such as the URL or other identifier of the web content in which the beacon is included. The beacon may provide access to the URL of the web content in which the beacon is included (e.g., via a source attribute). For example, the beacon may cause an HTTP message request (e.g., a GET request, a Post request, or any other standard message type), and the message request includes the URL in a query string to be sent to the collection service 130. In one example, the beacon may be JavaScript code that accesses the URL of the web content in which the code is included, and includes the URL of the web content in the URL of the source or "src" attribute of a <SCRIPT> tag, which results in a request for the resource located at the URL in the "src" attribute of the <SCRIPT> tag to a server of the collection service 130. In another example, the beacon may be an <IMG>tag call which also results in a request for the resource located at the URL in the "src" attribute of the <IMG> tag to be sent to a server of the collection service 130. Because the URL of the web content is included in the "src" attribute, the collection service 130 receives the URL of the web content. The collection server 130 can then return a transparent image.

The following is one example of such a JavaScript:
<script type="text/javascript">
document.write("<img id='img1' height, '1' width='1'>");document.getElementById("img1")
.src="http://example.com/scripts/report.dll?C7="+escape(window.location.href)+"&rn="+Math.floor(Math.random()*99999999);
</script>

A server of the collection service 130 records the web content URL received in the beacon message with, for instance, a time stamp of when the beacon message was received, the IP address of the client system from which the beacon message was received, and/or the user-agent of the browser application. The collection service 130 collects or aggregates the recorded information and stores the collected or aggregated information.

Thus, as users of user devices access web content (e.g., on the Internet), the user devices also access the web content that includes the beacon, which results in the beacon messages being sent to the collection service 130. The beacon messages indicate the web content, such as, for example, an advertisement, that was accessed by the user device (e.g., by including the URL for the web content) and an identifier associated with the request by the user device that sent the beacon message. When a beacon message is received at a server of the collection service 130, a record may be generated for the received beacon message. The record may indicate an identifier (e.g., the URL) of the webpage or other content accessed by the user device, a time at which the user device accessed the webpage (e.g., by including a time stamp of when the message was received by the collection service 130), a network address, such as an IP address, associated with the user device that accessed the webpage, and a user-agent of the browser application. The collection service 130 also may remove any PII and aggregate these records, store the aggregated records, and provide them to the analysis service 135, as describe in further detail below.

As pointed out above, the service providers 110 provide access to content across multiple media platforms. As a result, the service provider 110 also has access to additional information regarding user's consumption of content and advertising of offline content. For example, a service provider providing TV programming of an offline service provider 120 to a user through a STB 147 has access to information from the STB 147. For example, the service provider 110 can access the STB 147 to determine when the STB is on, what channel or content the STB is tuned to or being accessed, how long the channel or content was accessed, the time and date associated with the activity, a time stamp, a STB identifier, and even if the STB was being actively used (e.g., indicating it is being watched versus idle) using "trick events" which are normally referred to as pause, fast forward, rewind, volume up/down. Because the service provider has unique access to this information and information concerning the users other devices, such as IP addresses associated with the user devices or a connection point used by these devices (e.g., a gateway in a household), the service provider is in the unique position to help identify user activity across multiple media platforms. However, because of privacy concerns, the service provider 110 may not want to share this information with data analysis services. Therefore, the following processes may be used to correlate user activity across multiple media platforms while addressing user privacy concerns and issues.

Figure 1B:
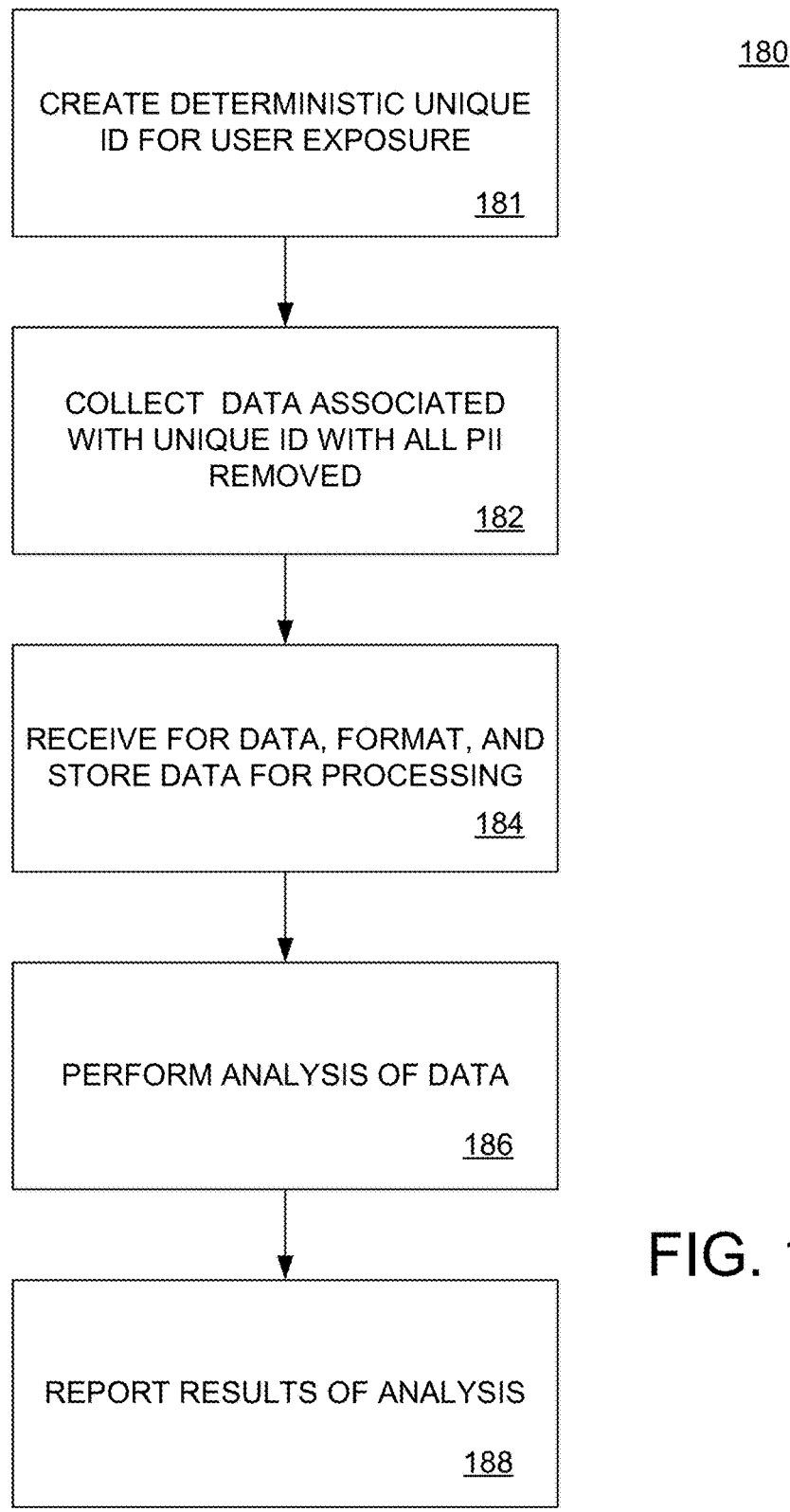
FIG. 1B shows a general process flow for the system of FIG. 1A.

In order to address privacy concerns, FIG. 1B shows an example of a general process flow 180 that may be used collect content and advertising consumption of users during a given time period and provide accurate and comprehensive analysis of user behavior in a privacy-friendly manner that does not require sharing of PII with the data analysis services or revealing the identity of the underlying individual users during analysis.

The process 180 creates a unique identifier (ID) for association with an exposure to content that does not include any user PII (181). In one example, a deterministic, one-way function is applied to PII that is included with any request or data collection (e.g., in response to an API call or a beacon message) to create a unique ID. A deterministic function when given a particular input, will always produce the same output. Because the unique ID is deterministic, the unique ID may be used to consistently collect, aggregate, and analyze user behavior attributable to a specific network location or endpoint providing access to a user device consuming the content. However, since the function is one-way, the unique ID may not be reversed to obtain the user's PII or identify. Therefore, the user's identity and PII are protected while allowing meaningful collection and analysis to be performed. Any one-way, deterministic function may be used to create the unique ID as long as the function consistently provides the same output for the same PII input to the function. For example, use of a deterministic algorithm to create the unique ID, allows the algorithm to be used at multiple distinct and/or distributed locations to consistently generate the same deterministic unique ID for data received having a specific PII (such as, for example an IP address for any entity that considers or treats an IP address as PII).

One example of a deterministic, one-way function is a hash function. For example, a typical request, such as an HTTP request sent to the collection service 130 may include PII, such as an IP address. In this example, the unique identifier may be generated by creating a hash of the IP address received by the collection service 130 using a cryptographic algorithm, such as a message digest (MD) algorithm. For example, the MD5 message-digest algorithm, a widely used cryptographic hash function, may be used to produce a 128-bit (16-byte) hash value that is used as the unique ID. However, a skilled artisan will appreciate that other deterministic algorithms and hash functions may be used to generate the unique ID from an IP address.

For example, when a user device 140, 145 first sends a beacon message to the collection service 130, a unique ID may be generated by the collection service 130 for the user or household (and associated with the received beacon message). The unique identifier may be generated by creating a hash of the IP address received in the beacon message using the MD5 message-digest algorithm to produce a 128-bit (16-byte) hash value for the unique ID. According to this example, the unique identifier is an MD5 hash of the IP address received in the beacon message and some additional content, such as, for example, a country code derived from a Geo lookup, and/or a text phrase as salt.

In another example, the service provider 110, 112, 117 has information, such as an IP address, which may be used to identify their users' point of access/connection during the exposure event to online content or be associated with a household account to track exposure to offline content. The unique ID may be generated from an IP address provided from the service provider 110, 112, 117 using a ping, a relay, or a batch process from the service provider 110, 112, 117 to the collection service 130. The collection service 130 then determines a unique ID using an IP address provided in the ping, relay, or batch and may remove any PII. The unique ID also may be returned to the service provider in response.

In one example, the service providers 110, 112, or 117 may "ping" the collection service 130 in real-time (e.g. on exposure to an event) for creation of a unique ID to be associated with the event in the same manner as beacon message. In this example, the service provider 110, 112, 117 generates an HTTP request to the collection service 130 with an IP address at the time of access or exposure associated with the IP address.

In another example, a service provider may delay reporting of event exposures or access. For example, a service provider may compile of file of IP addresses associated with access or API call for service of the provider over time period. The service provider then runs the files of IP addresses using an X-ForwardedFor parameter to place the IP addresses in the HTTP request header sent to the collection service. This type of reporting to the collection service may be done periodically (e.g., hourly, daily, weekly), at specific times, or on an ad hoc time frame basis.

In yet another example, a service provider 110, 112, 117 may use an API or script to generate a request with the PII to the collection service 130, which then uses the deterministic, one-way function to create a unique ID for the PII. This process may be a batch process providing a number of IP addresses at the same time. The collection service 130 determines and returns the unique ID to the requesting service provider 110, 112, 117.

In addition, the service provider 110, 112, 117 may provide the collection service 130 (via the ping, the relay, or the batch process) obfuscated service provider user IDs in addition to any number of user attributes (e.g. exposed/not-exposed flags, platform indicator, gender, age, etc.) to facilitate intended research. The service provider user IDs can be obfuscated using some alternate-ID or hashing algorithm to prevent the data analysis service 135 from identifying specific users within the data, while maintaining a connection of the users to their IP addresses via association with the deterministic, unique ID. This facilitates analysis of specific users or households by the data analysis service 135, while protecting the individual user's identity when the associated data is beyond control of the service provider 110, 112, 117.

For example, the service provider 110 may associate the unique ID with data generated in association with offline content by a user and/or household that otherwise would not have an IP address associated with the data (e.g., offline data). For example, offline data generated may a household may be associated with the received unique ID and sent to the collection service 130 or directly to the analysis service 135 without providing any PII to the data analysis service 135. Associating the unique ID with the offline data allows the offline data to be aggregated and analyzed with the online data.

In another example, the deterministic, one-way function may be provided to various service providers 110, 112, 117. In this example, the service provider can create the deterministic, unique ID and associate the unique ID with any data internally prior to providing the data to the collection service 130 and/or the data analysis service 135. As a result, no PII is provided or used outside the service provider 110, 112, 117, providing maximum control of user PII by the service provider.

The following shows one example of the data received by the collection service 130:

| Data Received by data Collection Server | | | |
|---|---|---|---|
| ip_address_raw | SP user_id | field1 | timestamp |
| 25.39.144.88 | 1234567890 | 0 | Mar. 6, 2014 18:45 |
| 45.13.130.9 | 2345678901 | 1 | Mar. 7, 2014 15:07 |
| ... | ... | ... | ... |
| 143.30.99.60 | 3456789012 | 1 | Mar. 7, 2014 23:41 |

The following shows one example of data sent to the data analysis service 135 with PII removed.

| Data Sent to data Analysis Service | | | | |
|---|---|---|---|---|
| ip_address_hash | collection_id_hash | data_field1 | data_field2 | data_field3 |
| 4b956276fb | b09001ccfb | 1234567890 | 0 | Mar. 6, 2014 18:45 |
| 3rv8he090x | 0aa1334300 | 2345678901 | 1 | Mar. 7, 2014 15:07 |
| ... | ... | ... | ... | ... |
| 9m8n15fjak | c2c608c09e | 3456789012 | 1 | Mar. 7, 2014 23:41 |

These examples are shown to illustrate the creation and association of a unique ID. It will be appreciated that there may be additional data fields not shown as need for any particular application. For example, data fields for URLs, agents, demographics, etc may be included with the data received and sent from the collection service 130.

The data associated with deterministic, unique ID is received by the data analysis service 135 and is processed (184). In one example, data may be downloaded from the collection service 130 to the data analysis service 135. Data associated with the unique ID also may be received by the data analysis service directly from a service provider 110.

In order to protect privacy, a specified set of controls may be placed between the collection service 130 and data analysis service 135. For example, the data analysis service 135 may not be permitted to access the equipment of the collection service 130 and can only download the collected data. In addition, the data can be removed from the collection service 130 after it is downloaded by the analysis service 135. The collected data may be automatically downloaded by servers of the data analysis service 135 and processed in batches. For example, the data analysis system 135 may process a row from the collected data and write a new row of data to a file that is the processed data of record before storing the data for analysis.

The processed data may then be aggregated by the deterministic, unique ID and analyzed (186). By aggregating data by unique ID, unique user or household behavior may be recorded in databases and analyzed over multiple media platforms or content sources where data is anonymous and the privacy of the user PII is maintained. Various types of analysis may be run on the data sets, such as, for example, audience analytics, advertising analytics, web & monetization analytics, and mobile operator analytics. The analysis may be run on the same and different data sets varying the time frame, the geographical area, the network or service provider, the media type or platform, and even be used to predict future behavior and trends. In addition, the data sets may be continuously aggregated and updated. As a result, data analysis is able to capture changing trends and behavior in real time or near real time. Because data is continually aggregated over time, service providers, content providers, and advertisers do not need to service and maintain their own databases.

Various reports may be generated from the analysis to show and explain behaviors, trends, results or effectiveness of marketing campaigns or influence on use behaviors (188). This allows service providers, content providers, and advertisers to make informed decisions about how to market, price, and deliver their content, advertisements, and services.

The following description provides several examples of data collection and aggregation in the system 100 and process flow 180.

Figure 2:
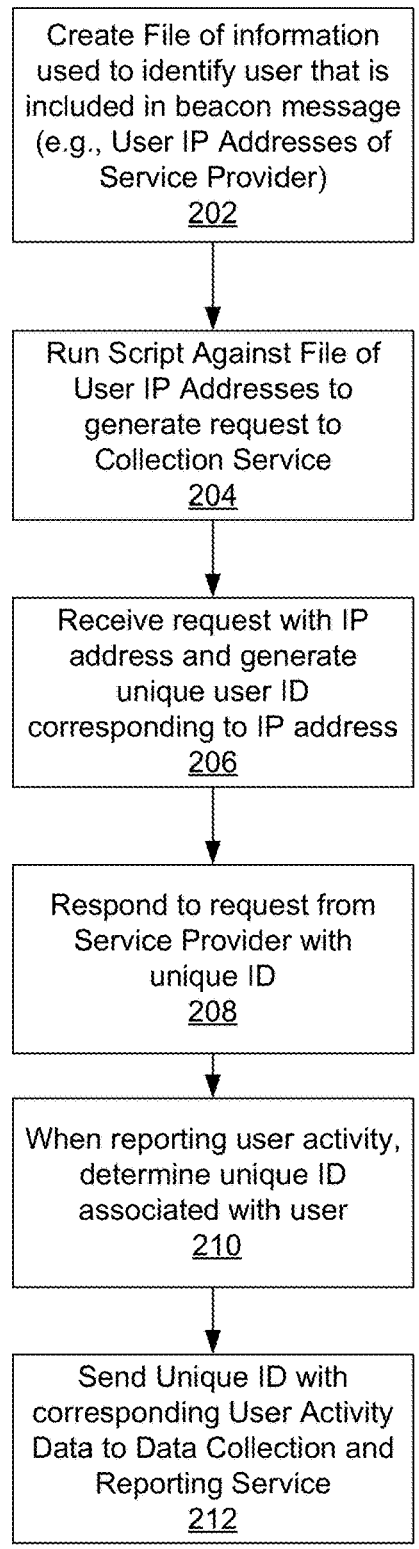
FIG. 2 is a flow chart illustrating an example of a process to create a unique client ID.

FIG. 2 is a flow chart illustrating an example of a process 200 to create a unique client ID by the service provider 110 that may be shared with other entities, such as the data analysis service 135.

First, the service provider 110 creates one or more records or files storing information known to the service provider 110 that may be used to identify a user that is included in a beacon message (202). For example, values from an HTTP request, such as the IP addresses of user devices, or the household gateway or router that is used by the user devices, that are serviced by the service provider 110 may be stored. Examples of the IP addresses include the IP address of mobile devices 140 and static devices 145 that use an IP protocol for communication. The IP address is a numerical label assigned to each device that is part of a computer network that uses the Internet Protocol for communication. The IP address serves two principal functions: host or network interface identification and location addressing. Because the IP address can be used to uniquely identify a device, it can also be used to potentially identify a user and thus may be considered PII. Other values that may be included in the header of an HTTP request, such as a user agent or mobile phone account ID, for example, used in a mobile app, could also be used.

The service provider 110 accesses the record or file to generate messages to the collection service 130 (204). For example, a server of the service provider 110 may run a script or other code against the information from the record or file (e.g., user associated IP addresses) to generate requests (similar to the beacon messages) addressed to one or more of the servers of the collection service 130, where the requests include the information from the record or file. The servers of the collection service 130 receive the requests with the information and extract or process the information (e.g., a user associated IP address) to generate a unique ID (206). The unique ID may be generated using the deterministic one-way function. For example, the collection service 130 can create an MD5 hash using the IP address and other information (e.g., country code and salt) and store the hash as a unique ID. The collection service 130 responds to the request from the service provider 110 with the generated unique ID which is stored in association with the user account corresponding to the user information (e.g., the IP address) (208).

When the service provider 110 reports other user activity corresponding to a non IP based media platform (e.g., any activity that is not accessing web content using a browser, mobile app, or other program), such as user or household TV viewing information, the service provider 110 determines the unique ID received from the collection service 130 that is associated with the user or their account (210). For example, the service provider 110 can access the information from a user account or determine an IP address associated with the user (e.g., a device or household router) and perform a table lookup to determine the unique ID (e.g., the MD5 hash of an IP address) associated with the accessed or determined IP address. The service provider 110 sends or appends the unique ID when reporting the corresponding user activity data to the data analysis service 135 (212).

If no unique ID is found in the table lookup or user account (or as an alternative to the table look up), the service provider 110 can generate an HTTP request with information known to the service provider 110 that may be used to identify a user that is included in a beacon message (e.g., an IP address), send the request to the collection service 130 to request generation of a unique ID, and receive a unique ID to be associated with the user in response to the request. The received ID may be appended to any reporting of offline or other non-IP activity of the user.

Figure 3:
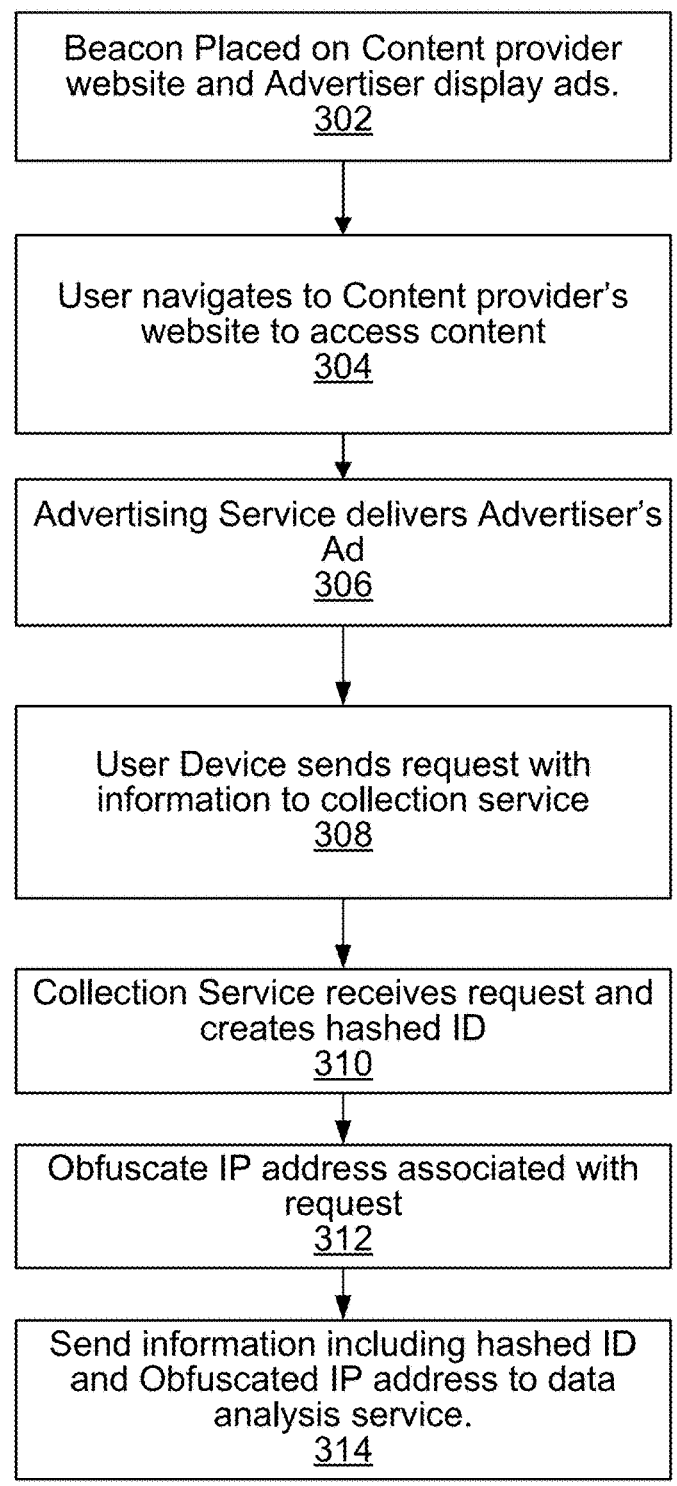
FIG. 3 is a flow chart illustrating an example of a data collection process.

FIG. 3 is a flow chart illustrating an example of a data collection process 300. As described above, a beacon is placed in content provided by the content provider website 115 and/or in an advertiser's display ads (e.g., provided in association with the web content) from an advertising service 125 (302). The user navigates to the content provider's website and accesses content (304). The advertising service 125 delivers an advertiser's ad in response to request from the browser or mobile app of the user device when rendering or otherwise employing the accessed content (306). The browser, mobile app, or other program of the user device processes the beacon causing the browser, mobile app, or other program to send a beacon message (e.g., an HTTP request) with additional information to the collection service 130 (308). For example, the beacon message may include the web content URL, the IP address of the location where the user device from which the beacon message was received accesses a network, and the user-agent of the browser application.

A server of the collection service 130 receives the beacon message and processes the message using the information supplied with the message to create a unique ID (310). The unique ID may be generated, as described above, by creating an MD5 hash of the IP address and other information (e.g., country code and salt); however, one will appreciate that other algorithms and hashes may be used to generate a unique ID from the information received in the beacon message.

In addition, an IP address includes useful information for the data analysis service 135. At the same time, various parties, including the service provider 110 and the data analysis service 135, wish to ensure that privacy of any user PII is maintained and avoid any liability associated with possessing the user PII. Therefore, the collection service 130 additionally obfuscates the IP address received in the beacon message (312) prior to sending the information (including the unique ID and obfuscated IP address) to the data analysis service 135 (314).

The IP address may be obfuscated by modifying a portion of the IP address so that the IP address no longer can be used to identify a specific user. In one example, a portion of the IP address is irreversibly modified while the remainder of the IP address is maintained, so that the remainder can be used in the data analysis of the data analysis service 135. For example, if A, B, C, and D represent the 4 octets of an IP4 IP address, the obfuscation process (312) modifies the last octet D while maintaining the first three octets A, B, and C. For example, if the original IP is A.B.C.D, the last octet D may be converted as follows: (INT(D/8)*8)+MOD(D,2)+1. Alternatively, the last octet may be deleted entirely and set to a predetermined value (e.g., "0"). This may be useful, for example, when using the last octet as a flag, or for the purpose of identifying the IP address as corresponding to a particular service provider. As a result, the original IP address of the request is never sent to the data analysis service 135 and only the "obfuscated" IP address is passed forward. In this example, the obfuscation cannot be reversed. Other information provided in the beacon message that could be considered PII could also be obfuscated in a similar manner if desired. Therefore, useful information associated with beacon message (e.g., a portion of the IP address) is maintained, while anonymity and privacy of the end user is protected.

Figure 4A:
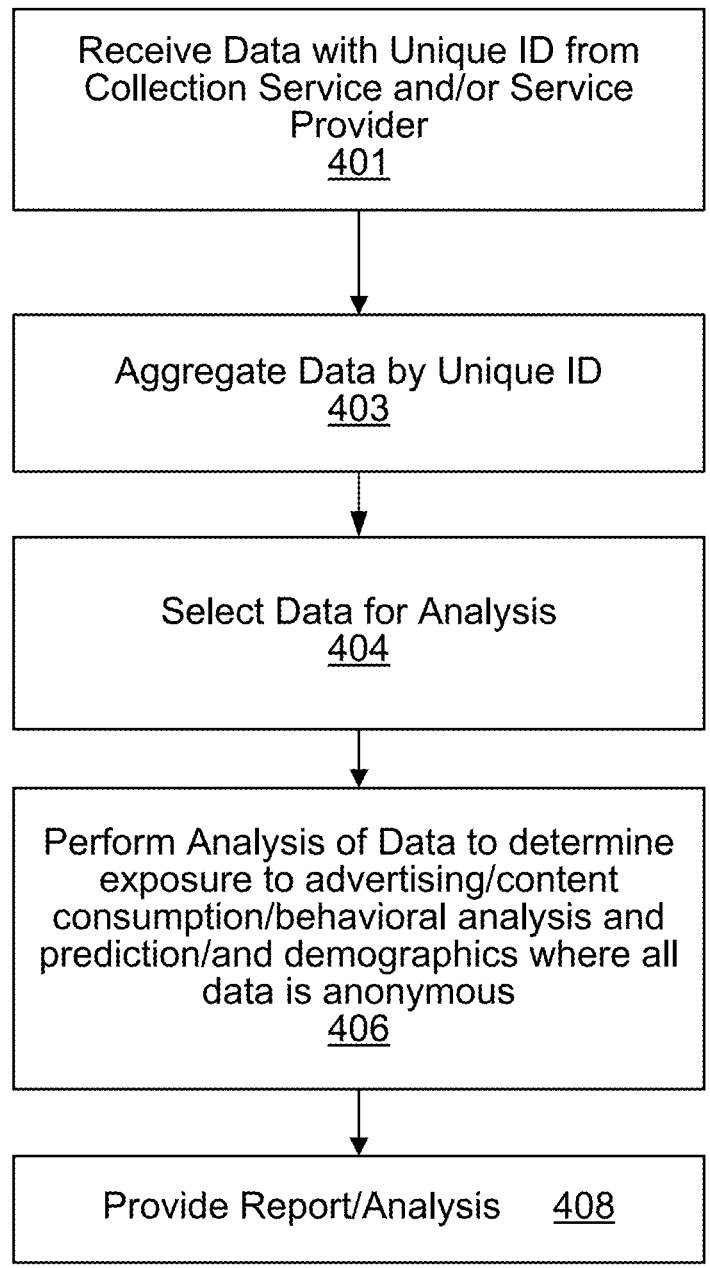
FIGS. 4A and 4B are flow charts illustrating examples of a data analysis process.

FIG. 4A is a flow chart illustrating an example 400 of a data analysis process performed by the data analysis service 135.

The data analysis system 135 receives data with an associated unique ID from one or more of a collection service and/or a service provider (401). For example, one or more servers of the data analysis service 135 may be programmed to automatically download the data and information from the collection service 130. Data may be processed in periodic batches from the collection service 130, and then deleted once processed. In one example, during processing, a server of the analysis service 135 processes each row of received data and then writes a new row of data to a file of a database that is the data of record. The information or data of record may then be stored or warehoused in one or more databases of the data analysis service for use by the processing devices and their associated applications or programs to apply various analytics and algorithms to the data and thereby generate reports about, for example, user behavior, content consumption, and advertising effectiveness.

In addition, one or more servers of the data analysis service 135 also may receive information and data relating user activity related to a media platform that is not associated with Internet protocols directly from a service provider 110. For example, the information may be TV viewing data and include data, such as demographic data, and usage data, such as channels viewed with time stamp, corresponding date, time, and duration of viewing. If the received data includes an associated unique ID, the data may be processed into a file of a database that is the data of record.

The data analysis system then aggregates data by the unique ID (403). Data with an associated unique ID represents an action or exposure to content by a specific user or household without revealing the underlying user's identity. Therefore, data aggregated by unique ID may be aggregated to build a consistent profile of a specific user's behavior or a household's behaviors (e.g., where multiple users access the network at the same IP address) over time, across platforms, media, content, and advertising without personally identifying any user by the data analysis system.

The data analysis system may then select data for analysis (404). Data stored by the system may be used in any manner required by the analysis to be performed. For example, data may be formatted to include specific information need by the analysis to be performed.

In one example, datasets may be created for analysis to the service provider based on an actual individual user/household level, for example, when the service provider 110, 112, 117 knows an IP address is associated with an individual user or household, and the service provider 110, 112, 117 provides an obfuscated service provider user ID that is then associated with the unique ID when the data is collected. As a result, analysis can be returned for a specific service provider user ID, which the service provider 110, 112, 117 may then translate to identify the actual user or household. In addition, additional algorithms may be applied to household data to convert the household data to an individual user level data.

Once datasets have been selected, the data analysis system performs analysis of the data to determine exposure to advertising/content consumption/behavioral analysis and prediction/and demographics where all data is anonymous (406). Various types of analysis may be run on the datasets, such as, for example, audience analytics, advertising analytics, web & monetization analytics, and mobile operator analytics. The analysis may be run on the same and different datasets varying the time frame, the geographic area, the network or service provider, the media type or platform, obfuscated service provider user ID, and can even be used to predict future behavior and trends. In addition, the datasets may be continuously aggregated and updated as new raw data is received from the collection service and/or the service providers. As a result, data analysis is able to capture changing trends and behavior in real time or near real time.

The data analysis system may provide report/analysis to any interested party without revealing user PII (408).

Figure 4B:
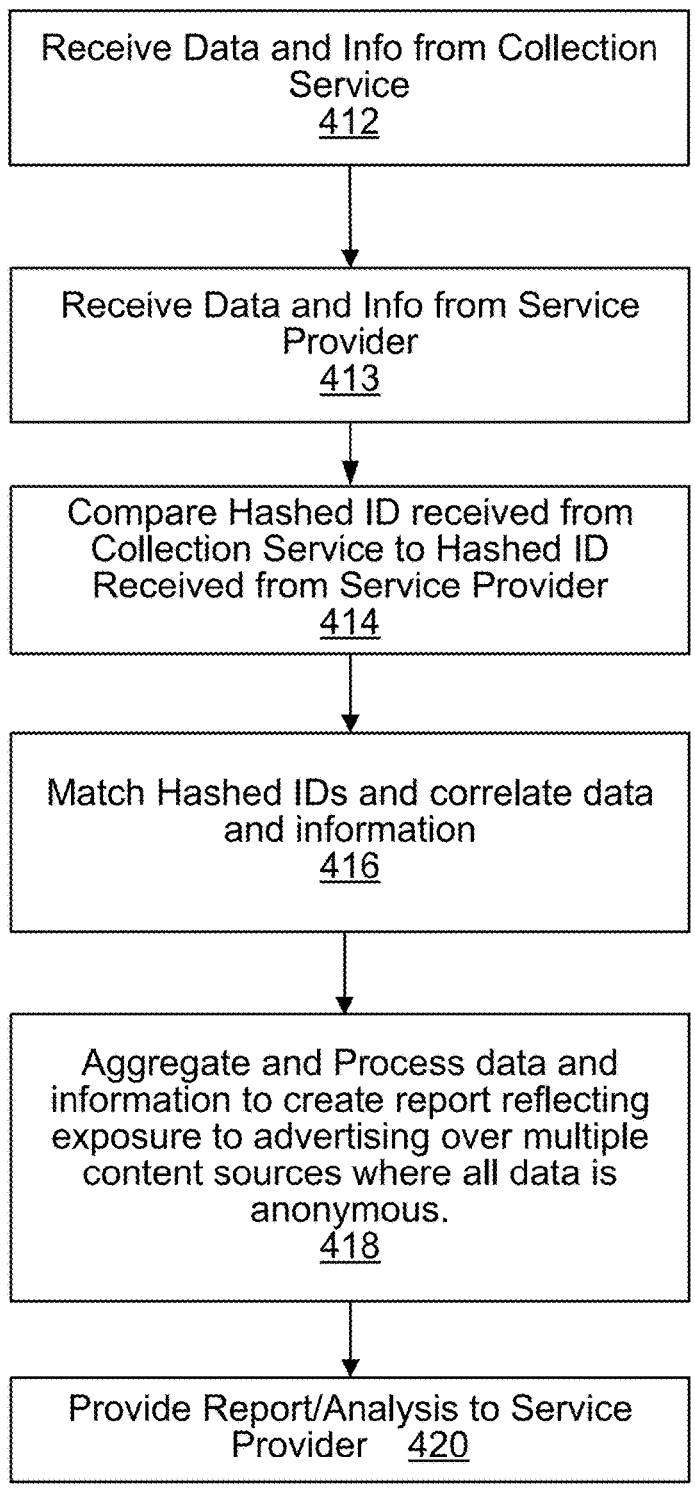

FIG. 4B is a flow chart illustrating an example 410 of a data analysis process. One or more servers of the data analysis service 135 receive data and information including an associated unique ID from the collection service 130 (412). For example, one or more servers of the data analysis service 135 may be programmed to automatically download the data and information from the collection service 130. Data may be processed in periodic batches from the collection service 130, and then deleted once processed. In one example, during processing, a server of the analysis service 135 processes each row of data and then writes a new row of data to a file of a database that is the data of record. The information in the database may then be used by the processing devices and their associated applications or programs of analysis service 135 according to various analytics and algorithms to generate reports about, for example, user behavior, content consumption, and advertising effectiveness.

In addition, one or more servers of the data analysis service also may receive information and data, including an associated unique ID, directly from a service provider 110 regarding offline user activity, for example, related to a media platform that is not associated with Internet protocols (413). For example, the information may be TV viewing data and include data, such as demographic data, and usage data, such as channels viewed with time stamp, corresponding date, time, and duration of viewing that is provided with the unique ID.

When performing analysis of the data, or as part of preprocessing of the data before analysis, the data received from the collection service 130 is compared to the data received directly from the service provider 110 (414). For example, one or more processing devices of the analysis service 135 compare the unique ID (e.g., the hashed MD5 ID) associated with data received from the collection service 130 to the unique ID (e.g., the hashed MD5 ID) associated with data received from service provider 110. If a match is determined between the hashed IDs, the data associated with the IDs may be correlated as being associated with one or more of the same user, the same household, or the same device (416).

The correlated data may then be aggregated and processed to create various reports reflecting exposure to advertising over multiple media platforms or content sources where data is anonymous and the privacy of the user PII is maintained (418). As result, service providers 110 may feel more confident and be more likely to share information with collection services 130 and analysis services 135 knowing the privacy of their users is respected and maintained.

In the example shown in FIG. 1, the system 100 shows only five users and their devices for simplicity; however, it is understood that 100 the system 100 shown in FIG. 1 can be distributed over various geographies serving millions of users. Similarly, the system 100 of FIG. 1, for simplicity of illustration shows two service providers 110, 112, a content provider 115, a service provider 117, a TV content provider 120, an advertising service 125, and collection service 130, and a data analysis service 135. However, a skilled artisan reading this description will appreciate that systems may include thousands, even millions of content and services providers, including hybrid content and service providers, in addition to hundreds of non-web IP content systems and advertisers. For example, a user device may access data or use resources from multiple content providers 115. In addition, although a single server and database are shown for these services and providers, in practice, multiple servers and processing devices and even banks of servers may be used and arranged in various configurations to receive, send, and process data for any number of reasons, such as redundancy, load balancing, volume, and processing requirements, to name a few. In addition, although the services and providers are shown in the drawing as single entities or locations, it will be appreciated that they may be configured to provide a location that is centralized or remote from the perspective of any one user. For example, a central location may be one physical location, such as a room, building, or campus providing the hardware components of the system. However, in reality the central location also may be virtual or distributed where services are provided, content are accessed from, and data are stored over a number of distributed systems and/or geographic locations. In other words, although the collection service, the analysis service, and the service provider systems are shown in FIG. 1 are each shown as corresponding to a single block, other configurations wherein the applications, processing, services, content, and data are distributed both in terms of devices and geographical location are within the meaning of the service or content provider systems. Additionally, the service or content provider systems may use third parties to host data and provide processing including initiating services as needed on demand, for example, using cloud computing wherein the locations and structure providing the services change size, and physical location, distribution, and even equipment dynamically over time.

Each of the user devices, the collection service, the service providers, the content providers, analysis service, and any servers may be implemented using one or more special-purpose or general-purpose computers or processing devices capable of responding to and executing instructions in a defined manner. The computers or processing devices may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the computers or processing devices. In addition, the databases may be implemented using one or more mass storage devices or memories.

Figure 5:
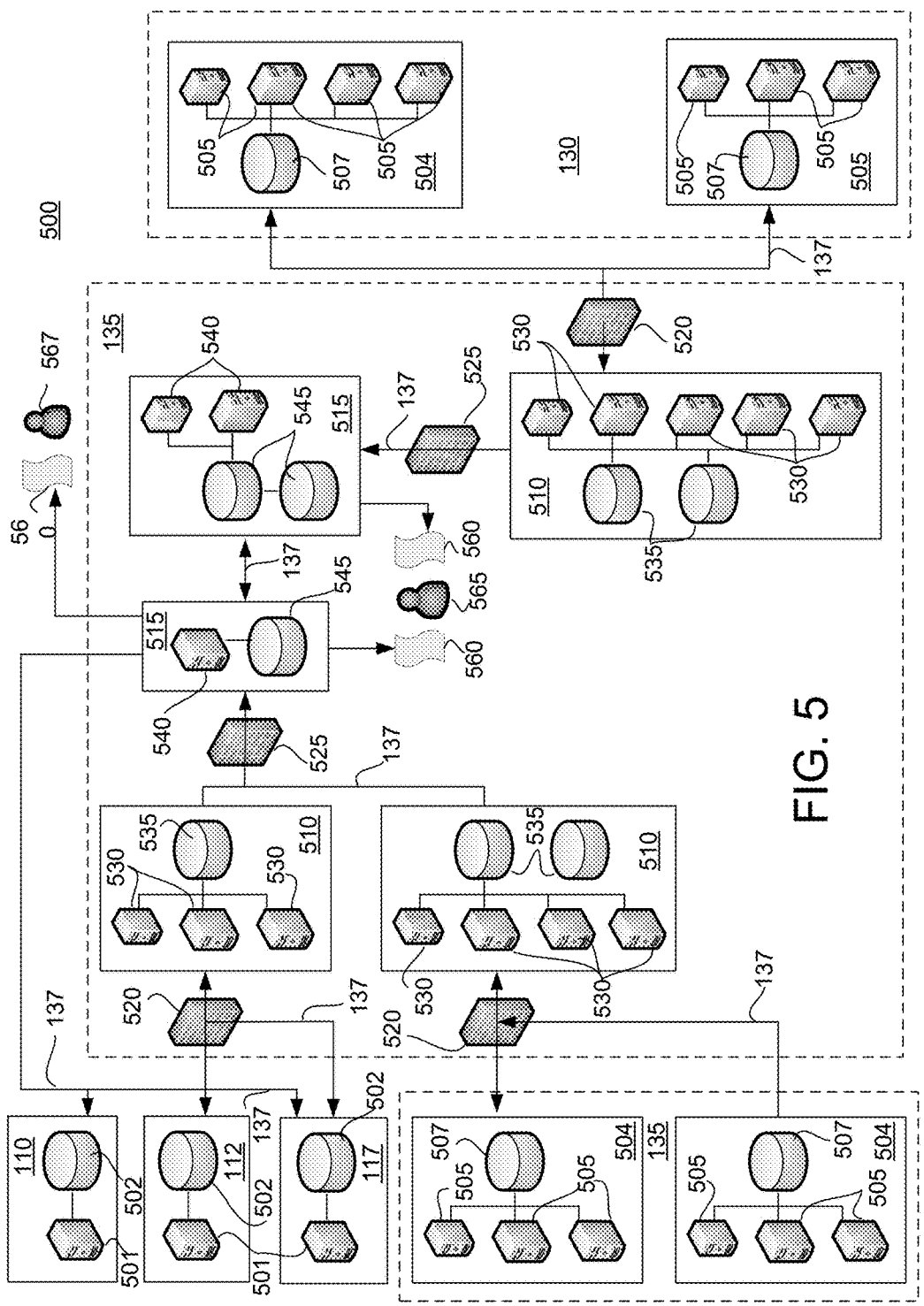
FIG. 5 shows an example of the systems for data collection and analysis while protecting user PII.

FIG. 5 illustrates an additional example 500 of the configuration of portions of the system 100 to better illustrate components and the distributed nature of the system. As shown in FIG. 5, a data analysis service 135 receives data from service providers 110, 112, 117, and collection service 130.

Each service provider 110, 112, 117 may include one or more servers 501 and corresponding storage devices 502.

The collection service 130 may include a plurality of distinct collection systems, networks, facilities, and/or locations 504. The collection systems 504 may include one or more servers 505 and corresponding data storage devices 507. For example, the collection service 130 can host a network of thousands of servers around the globe to handle a large volume of web requests with low-latency. Such a configuration allows the collection service 130 to run 24 hours a day, 7 days a week, and generate, for example, up to 15 terabytes new data per day.

As shown in FIG. 5, a data analysis service 135 receives data from service providers 110, 112, 117, and collection service 130. The data analysis service may include a number of data receiving systems 510 and a number of data analysis systems 515. The receiving systems 510 may be protected or isolated from exterior networks by external protections 520 (e.g., one or more security measures or firewalls). In addition, the data analysis systems 515 may be internally protected or isolated from the data receiving systems 510 by internal protections 525 (e.g., one or more security measures or firewalls) to prevent data corruption, unauthorized use of data, and consistent analysis of data. Any number of data reception systems 510 may be used to adequately handle load and volume of data received from the collection service 130 and service providers 110, 112, 117. For example, hundreds of servers in this environment, distributed across multiple data reception centers may be provided to handle 120 billion panel records per month (4B per day) and 1200 billion tag records per month with 15 terabytes new raw data per day.

Similarly data analysis systems 515 may include a plurality of processing devices and/or servers 540 and corresponding storage 545. The data analysis systems manipulate data stored and formatted by the data reception systems 510. For example, the data analysis system may access the formatted data to create databases of aggregate data from the records and correlate data from the records. The aggregated and correlated data may then be subjected to various application and programs to process the data to derive metrics and analytics from the data used to provider reports 560. The reports may be used by analysts 565 of the data analysis system to interpret the reports and design additional models and analytics for manipulating, analyzing, and generating additional reports 565. Additionally, the generated reports 565 may be provided to others 567 (e.g., content provider or advertisers) and to the service providers 110, 112, 117 to illustrate the results and interpretations of the analysis performed to those making decisions about the operation of the various content and service providers. Any number of data analysis systems 510 may be used to adequately handle load and volume of data analyzed. For example, the data analysis systems are able to generate over 200,000 reports on peak days (e.g., 57 reports per second) providing fast, accurate, and on demand data analysis and reporting.

It should be noted that due to the amount of data generated by various devices, platforms, networks, media across the systems 100 and 500, such handling of such data, its formatting, processing, and analysis cannot be practically performed or implemented without the aid of computer processing and storage devices, such as the servers and data storage of the various service provider 110, 117, collection service 130, and analysis service 135. Nor is the implementation described merely an abstract idea implemented by the generic computers, rather it is a technical solution to the problem of interpreting and understanding user behavior without relying on PII. In order for data to be accurately analyzed, a deterministic, unique ID is generated that may be used across various devices, platforms, networks, media allowing aggregation and analysis of user data without use of PII. In addition, specific applications are provided on computers to execute programs across different networks and platforms that ensure a coordinated effort to manage the data such that it is systematically aggregated into the proper format to provide accurate and efficient analysis in a real time or near real time manner. The need to protect user privacy is very real, and the systems described herein offer this protection while providing accurate, meaningful, and timely analysis of data.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The processes (e.g., such as those shown in FIGS. 1B, 2, 3, 4A and 4B, and 5) can be performed by one or more programmable processing devices or processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. The computers described herein may include one or more processors. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory or solid state drive devices; magnetic disks, such as, internal hard disks or removable disks; magneto-optical disks; and CD-ROM and DVD-ROM disks. The processor and the memory can be supplemented by, or incorporated in special purpose logic circuitry.

The communications paths 137 may be configured to send and receive signals (e.g., electrical, acoustic, electromagnetic, or optical) that convey or carry data representing various types of analog and/or digital data including programming, software, media, information, and content, among others. For example, the communications paths may be implemented using various communications media and one or more networks comprising one or more network devices (e.g., network interface cards, fiber media converter, servers, routers, switches, hubs, bridges, repeaters, blades, processors, and storage devices). The one or more networks may include a local area network (LAN), a wide area network (WAN), an Ethernet, a global area network (GAN), a cloud network, a plain old telephone service (POTS) network, a digital subscriber line (DSL) network, an integrated services digital network (ISDN), a synchronous optical network (SONNET)/SDH, Passive and Active Optical Networks (PON or AON), a packet switched network, V.92 telephone network modems, IRDA, USB, Firewire, EIA RS-232, EIA-422, EIA-423, RS-449, RS-485, ITU, T1 and other T-carrier links, and E1 and other E-carrier links, varieties of 802.11, GSM Um radio interface, Bluetooth, IEEE 802.11x Wi-Fi, TransferJet, Etherloop, ARINC 818 Avionics Digital Video Bus, G.hn/G.9960, or a combination of two or more of these networks, to name a few.

In addition, the communications paths 137 may include one or more wireless links (e.g., microwave, radio, and satellite) that transmit and receive electromagnetic signals, such as, for example, radio frequency, infrared, and microwave signals, to convey information/data signals using any one of a number of communications protocols, for example, communications links may include IMT-2000, such as 2G (GSM, GPRS, EDGE, EDGE Evolution, CSD, HSCSD), 2.5G, 2.75G, 3G (W-CDMA, HSPDA, HSUPA, UMTS-TDD, FOMA), 4G, and IEEE 802.11 standards, such as Wi-Fi or WLAN, and HDTV and SDTV transmissions. In one example, a communications path 137 may include the Internet or World Wide Web or components found therein.

Figure 6B:
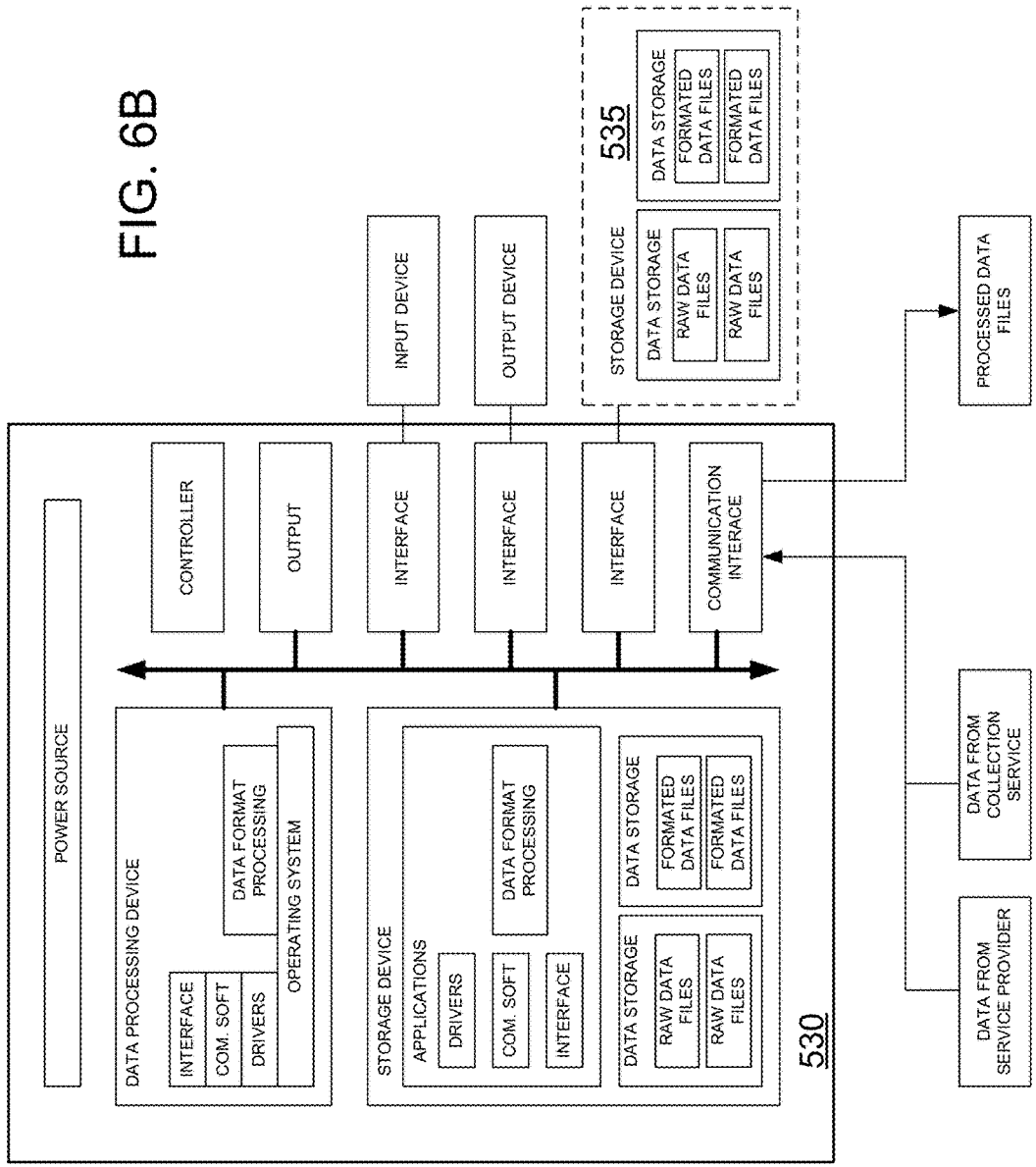

FIG. 6A, 6B, 6C show several examples of various configurations of possible programmable processing devices and memory devices for use with the system 100 and example 500.

FIG. 6A shows one example of a server 505 and data storage 507 of a data collection system 501. The server 505 may include a power source, one or more data programmable data processing devices, an internal storage device, one or more controllers, an output device, one or more interfaces for communication with external input devices (e.g., touch screens/pads, keyboards, pointer or mouse), one or more interfaces from communication with external output devices (e.g., touch screens, displays, monitors, projection devices), one or more interfaces for communication with an external memory device 507, and one or more communications interfaces configured to send and receive data to and from the communications paths 137. In addition, one or more internal communication links or busses may be provided in order to connect the various components and allow reception, transmission, manipulation and storage of data and programs.

The communications interface may receive service provider API calls, messages, such as pings, relays, and HTTP requests, including beacon or tag requests. In addition, the interface may receive data download requests from the data analysis service and send the requested data to the analysis service via a communications path 137.

The data processing device may include one or more processors running an operating system. In addition, the data processing device may run various drivers, communications software, interface software, in addition to applications for collection of data and the deterministic, one-way unique ID creation implementing, for example, processes 181 and 182 of FIG. 1B, 206 and 208 of FIG. 2 and 310, 312, 314 of FIG. 3 that support the efficient operation of the data collection and analysis of the system 100 and example 500.

The server 505 also may include one or more internal memory devices for storing software and applications, such as the software for drivers, communications, and interface, in addition to the deterministic, one-way unique user ID creation function and data collection software. The internal memory device also may store data files used during the processing of data collection prior to writing the data files to an external memory device.

FIG. 6B shows one example of a server 530 and memory device 535 of a data receiving system 510. The server 530 may include a power source, one or more data programmable data processing devices, an internal storage device, one or more controllers, an output device, one or more interfaces for communication with external input devices (e.g., touch screens/pads, keyboards, pointer or mouse), one or more interfaces from communication with external output devices (e.g., touch screens, displays, monitors, projection devices), one or more interfaces for communication with an external memory device 535, and one or more communications interfaces configured to send and receive data to and from the communications paths 137. In addition, one or more internal communication links or busses may be provided in order to connect the various components and allow reception, transmission, manipulation and storage of data and programs.

The communications interface may receive data from the collection service 130 and data from service provider via a communications path.

The data processing device may include one or more programmable processors running an operating system. In addition, the data processing device may run various drivers, communications software, interface software, in addition to applications for receiving and aggregating data implementing, for example, processes 184 of FIG. 1B, 401 and 403 of FIG. 4A, and 410, 412 of FIG. 4B that support the efficient operation of the data collection and analysis of the system 100 and example 500.

The server 535 also may include one or more internal memory devices for storing software and applications, such as the software for drivers, communications, and interface, in addition to data receiving, format, and aggregation software. The internal memory device also may store data files used during the processing of data reception prior to writing the data files to an external memory device or warehouse for use by the data analysis systems 515.

FIG. 6C shows one example of a server 540 and memory device 545 of a data analysis system 515. The server 540 may include a power source, one or more data programmable data processing devices, an internal storage device, one or more controllers, an output device, one or more interfaces for communication with external input devices (e.g., touch screens/pads, keyboards, pointer or mouse), one or more interfaces from communication with external output devices (e.g., touch screens, displays, monitors, projection devices), one or more interfaces for communication with an external memory device 545, and one or more communications interfaces configured to send and receive data to and from the communications paths 137. In addition, one or more internal communication links or busses may be provided in order to connect the various components and allow reception, transmission, manipulation and storage of data and programs.

The communications interface may receive data from the data receiving system 510 and provide the generated reports and analysis via a communications path.

The data processing device may include one or more processors running an operating system. In addition, the data processing device may run various drivers, communications software, interface software, in addition to applications for processing, analysis, and report generation implementing, for example, processes 186, 188 of FIG. 1B, 404, 406, and 408 of FIG. 4A, and 414, 416, 418 and 420 of FIG. 4B that support the efficient operation of the data collection and analysis of the system 100 and example 500.

The server 535 also may include one or more internal memory devices for storing software and applications, such as the software for drivers, communications, and interface, in addition to data analysis and report generation software. The internal memory device also may store formatted data records, a database with aggregated/correlated data files used during the processing of the data and reports generated prior to writing the reports and analysis to an external memory device or warehouse. External or backup memory devices also may be provided.

Figure 7:
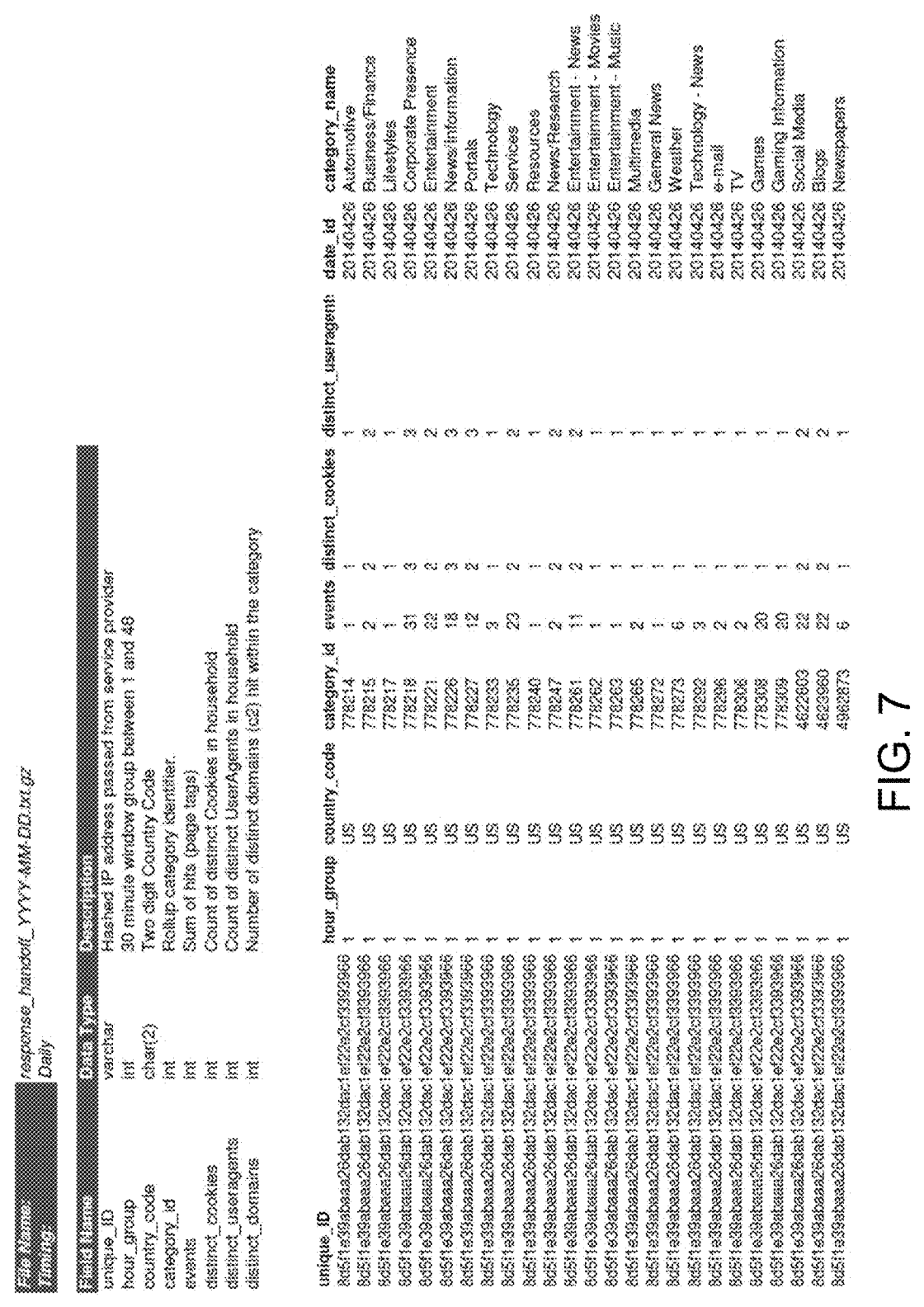

FIG. 7 shows an example of a census report for a unique ID that may be generated by the data analysis system. In this example, one report for unique ID 8d5f1e39abaaa26dab132dac1ef22e2cf3393966 shows the type of content consumed over a period of time without use of any PII. Of course, this report is exemplary and many other types of reports may be generated based on the specific data supplied and analysis performed.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer implemented method of providing analysis of exposure of users to content without the use of personally identifiable information by one or more processing devices of an analysis system, the method comprising:

receiving, by at least one of the processing devices of the analysis system, data including a plurality of first user information about access of online content by a plurality of users, wherein each of the first user information does not include any personally identifiable information regarding any of the plurality of users and is associated with a deterministic, unique identifier (ID) created using a one-way, obfuscated Internet Protocol (IP) address of an entity that is associated with a request to access the online content, wherein creating the one-way, obfuscated IP address comprises irreversibly obfuscating a portion of an IP address;

receiving, by at least one of the processing devices of the analysis system, data including a plurality of second user information about access of offline content by at least some of the plurality of users, wherein each of the second user information does not include any personally identifiable information regarding any of the plurality of users and is associated with a deterministic, unique ID created using a one-way function applied to personally identifiable information of an entity that is associated with the access of the offline content;

correlating, by at least one of the processing devices of the analysis system, any of the first user information about access of online content and the second user information about access of offline content having the same deterministic, unique ID;

creating, by at least one of the processing devices of the analysis system, a database of records including the first and second user information correlated by deterministic, unique ID, wherein the records do not include any personally identifiable information associated with the plurality of users; and processing, by at least one of the processing devices of the analysis system, a plurality of the records of the database by analyzing the correlated user information to generate a report about user exposure to content over multiple content media platforms including online content and offline content without using any personally identifiable information associated with the plurality of users.

2. The method of claim 1, wherein the offline content is TV programming or on demand video programming content.

3. The method of claim 2, further comprising determining, based on the processing of a plurality of the records, that one or more of the plurality of users has been exposed to the TV programming or on demand video programming content.

4. The method of claim 1, wherein:

creating the database of records includes storing the obfuscated IP address; and processing the plurality of the records of the database includes processing information obtained from the obfuscated IP addresses.

5. The method of claim 1, wherein the online content includes advertising content.

6. The method of claim 1, wherein irreversibly obfuscating the portion of the IP address comprises irreversibly obfuscating a first portion of the IP address and maintaining another portion of the IP address.

7. The method of claim 6, wherein irreversibly obfuscating the first portion of the IP address comprises deleting the first portion of the IP address.

8. A computer implemented method of providing analysis of exposure of users to content without the use of personally identifiable information by one or more processing devices of an analysis system, the method comprising:
 receiving, by at least one of the processing devices of the analysis system, data including a plurality of user information about access of online content by a plurality of users, wherein each of the user information does not include any personally identifiable information regarding any of the plurality of users and is associated with a deterministic, unique identifier (ID) created using a one-way, obfuscated Internet Protocol (IP) address of an entity that is associated with a request to access the online content, wherein creating the one-way, obfuscated IP address comprises irreversibly obfuscating a portion of an IP address;
 correlating, by at least one of the processing devices of the analysis system, any of the user information about access of online content having the same deterministic, unique ID;
 creating, by at least one of the processing devices of the analysis system, a database of records including the user information correlated by deterministic, unique ID, wherein the records do not include any personally identifiable information associated with the plurality of users; and
 processing, by at least one of the processing devices of the analysis system, a plurality of the records of the database by analyzing the correlated user information to generate a report about user exposure to online content without using any personally identifiable information associated with the plurality of users.

9. The method of claim 8, wherein:
 creating the database of records includes storing the obfuscated IP address; and
 processing the plurality of the records of the database includes processing information obtained from the obfuscated IP address.

10. The method of claim 8, wherein the online content is advertising content.

11. The method of claim 8, wherein irreversibly obfuscating the portion of the IP address comprises irreversibly obfuscating a first portion of the IP address and maintaining another portion of the IP address.

12. The method of claim 11, wherein irreversibly obfuscating the first portion of the IP address comprises deleting the first portion of the IP address.

13. A computer implemented method of collecting exposure of users to content without the use of personally identifiable information by one or more processing devices of a collection system, the method comprising:
 receiving, by at least one of the processing devices of the collection system, a message associated with access of online content by a user device, the message including an Internet Protocol (IP) address associated with a network location where the user device accessed the online content;
 applying, by at least one of the processing devices of the collection system, a deterministic, one-way function to at least the IP address of the message to generate a deterministic, unique identifier (ID) to render the unique ID unable to identify an entity generating the message;
 one-way obfuscating, by at least one of the processing devices of the collection system, the IP address used to create the deterministic, unique ID by irreversibly obfuscating a portion of the IP address;
 storing, by at least one of the processing devices of the collection system, a data record without any personally identifying information, the data record including the deterministic, unique ID, the obfuscated IP address, and additional non personally identifiable user information derived from the message; and
 transmitting the data record without any personally identifiable information to a data analysis system for analysis of the data record.

14. The method of claim 13, wherein applying the deterministic one-way function includes applying a deterministic, one-way hash algorithm to the portion of the IP address.

15. The method of claim 13, wherein the accessed online content is advertising content.

16. The method of claim 13, wherein irreversibly obfuscating the portion of the IP address comprises irreversibly obfuscating a first portion of the IP address and maintaining another portion of the IP address.

17. The method of claim 16, wherein irreversibly obfuscating the first portion of the IP address comprises deleting the first portion of the IP address.

18. A data analysis system providing analysis of exposure of users to content without the use of personally identifiable information, the data analysis system comprising:
 a data receiving system comprising:
  a communications interface receiving a plurality of user information about access of online content by a plurality of users, wherein each of the user information does not include any personally identifiable information regarding any of the plurality of users and is associated with a deterministic, unique identifier (ID) created using a one-way, obfuscated Internet Protocol (IP) address of an entity that is associated with a request to access the online content wherein creating the one-way, obfuscated IP address comprises irreversibly obfuscating a portion of an IP address;
  at least one processing device processing the received user information correlating any of the user information about access of online content having the same deterministic, unique ID and creating a database of records including the user information correlated by the deterministic, unique ID, wherein the records do not include any personally identifiable information associated with the plurality of users; and
 at least one storage device storing the plurality of records of the database; and
 a data analysis system comprising at least one processing device:
  accessing the stored records;
  aggregating the accessed records; and
  processing the aggregated records of the database by analyzing the user information to generate a report about user exposure to online content without using any personally identifiable information of the users.

19. The system of claim 18, wherein:
 the communications interface receives data including a plurality of other user information about access of offline content by at least some of the plurality of users, wherein each of the other user information does not include any personally identifiable information regarding any of the plurality of users and is does not include any personally identifiable information regarding any of the plurality of users and is associated with a deterministic, unique ID created using a one-way function applied to personally identifiable information of an entity that is associated with the access of the offline content by at least one of the at least some of the plurality of users;

the at least one processing device of the data receiving system correlates any of the user information about access of online content and the other user information about access of offline content having the same deterministic, unique ID, and creates a database of records including the user information about the access of online content and the other user information about the access of offline content correlated by the deterministic, unique ID, wherein the records do not include any personally identifiable information associated with the plurality of users; and the at least one processing device of the data analysis system accessing the database of records, aggregating the records from the database, and processing the aggregated records of the database by analyzing the user information to generate a report about user exposure to content over multiple content media platforms including online and offline content without using any personally identifiable information associated with the plurality of users.

20. The system of claim 19, wherein the personally identifiable information of the entity that is associated with the access of the offline content comprises an Internet Protocol (IP) address associated with the entity accessing the offline content.

21. The system of claim 18, wherein:

the at least one processing device of the data receiving system creates the database of records by storing the obfuscated IP address; and the at least one processing device of the data analysis system analyzes the user information by analyzing information obtained from the obfuscated IP addresses.

22. The system of claim 18, wherein irreversibly obfuscating the portion of the IP address comprises irreversibly obfuscating a first portion of the IP address and maintaining another portion of the IP address.

23. The system of claim 22, wherein irreversibly obfuscating the first portion of the IP address comprises deleting the first portion of the IP address.

* * * * *